(12) United States Patent
Syverson et al.

(10) Patent No.: US 11,435,249 B2
(45) Date of Patent: Sep. 6, 2022

(54) ELECTROSTATIC DISCHARGE RESISTANT PRESSURE SENSOR

(71) Applicant: DWYER INSTRUMENTS, INC., Michigan City, IN (US)

(72) Inventors: Neal Syverson, Michigan City, IN (US); Jason Berry, Michigan City, IN (US)

(73) Assignee: DWYER INSTRUMENTS, INC., Michigan City, IN (US)

( * ) Notice: Subject to any disclaimer, the term of this patent is extended or adjusted under 35 U.S.C. 154(b) by 384 days.

(21) Appl. No.: 16/424,921

(22) Filed: May 29, 2019

(65) Prior Publication Data

US 2019/0376863 A1   Dec. 12, 2019

Related U.S. Application Data

(60) Provisional application No. 62/683,922, filed on Jun. 12, 2018.

(51) Int. Cl.
*G01L 19/00* (2006.01)
*G01L 9/00* (2006.01)

(52) U.S. Cl.
CPC ........ *G01L 19/0084* (2013.01); *G01L 9/0052* (2013.01)

(58) Field of Classification Search
CPC ............. G01L 19/0084; G01L 19/0645; G01L 19/0046; G01L 19/069; G01L 19/0038;

(Continued)

(56) References Cited

U.S. PATENT DOCUMENTS 4,406,993 A * 9/1983 Kurtz .................. G01L 19/0645
  338/42
4,452,069 A * 6/1984 Hattori ................ G01L 19/0038
  73/35.12

(Continued)

FOREIGN PATENT DOCUMENTS

EP          3029443 A1    6/2016
WO     2015/156291 A1   10/2015
WO   WO-2015156291 A1 * 10/2015 ............... G01L 9/00

OTHER PUBLICATIONS

PCT International Search Report and Written Opinion for corresponding Application Serial No. PCT/US2019/034275, dated Aug. 12, 2019, pp. 1-11.

(Continued)

*Primary Examiner* — Nimeshkumar D Patel
*Assistant Examiner* — Gedeon M Kidanu
(74) *Attorney, Agent, or Firm* — Tarolli, Sundheim, Covell & Tummino LLP

(57) ABSTRACT

A pressure sensor includes a housing, a pressure chamber defined within the housing, and a pressure transducer. The pressure sensor also includes a header that seals the pressure chamber and supports the pressure transducer in the pressure chamber. A plurality of pins extend through respective openings in the header. The sensor pins have first ends electrically connected to the pressure transducer in the pressure chamber and second ends electrically connected to sensor electronics outside the pressure chamber. The pins are electrically insulated from the header. The header is configured so that the electrical insulation of at least one pin from the header is less than the electrical insulation of the remaining pins from the header.

14 Claims, 4 Drawing Sheets

(58) Field of Classification Search
CPC . G01L 19/0609; G01L 19/148; G01L 23/221;
G01L 9/00; F42B 3/103; F42B 3/195;
F42B 3/198; F42B 3/124; F42C 19/12;
H01B 17/30; H02G 3/26; H02K 11/33;
H02K 7/1838; H02K 9/14
See application file for complete search history.

(56) References Cited

U.S. PATENT DOCUMENTS

| | | | | |
|---|---|---|---|---|
| 6,176,137 | B1 | 1/2001 | Sasaki et al. | |
| 6,273,754 | B1* | 8/2001 | Bunch | H01R 13/405 |
| | | | | 439/935 |
| 6,374,678 | B1* | 4/2002 | Masuda | G01L 19/0084 |
| | | | | 73/706 |
| 6,450,039 | B1* | 9/2002 | Masuda | G01L 19/0069 |
| | | | | 73/756 |
| 9,835,512 | B2* | 12/2017 | Martin | B23K 1/0016 |
| 9,915,577 | B2* | 3/2018 | Strott | G01L 19/0069 |
| 2012/0067240 | A1* | 3/2012 | Hartl | F42B 3/198 |
| | | | | 102/202 |
| 2014/0260648 | A1* | 9/2014 | Aoyama | G01L 19/0046 |
| | | | | 73/725 |
| 2016/0153858 | A1* | 6/2016 | Strott | G01L 19/069 |
| | | | | 73/727 |
| 2017/0234751 | A1* | 8/2017 | Aoyama | G01L 19/0672 |
| | | | | 73/706 |

OTHER PUBLICATIONS

European Search Report for corresponding European Application Serial No. 19820632.8, dated Feb. 9, 2022, pp. 1-9.

\* cited by examiner

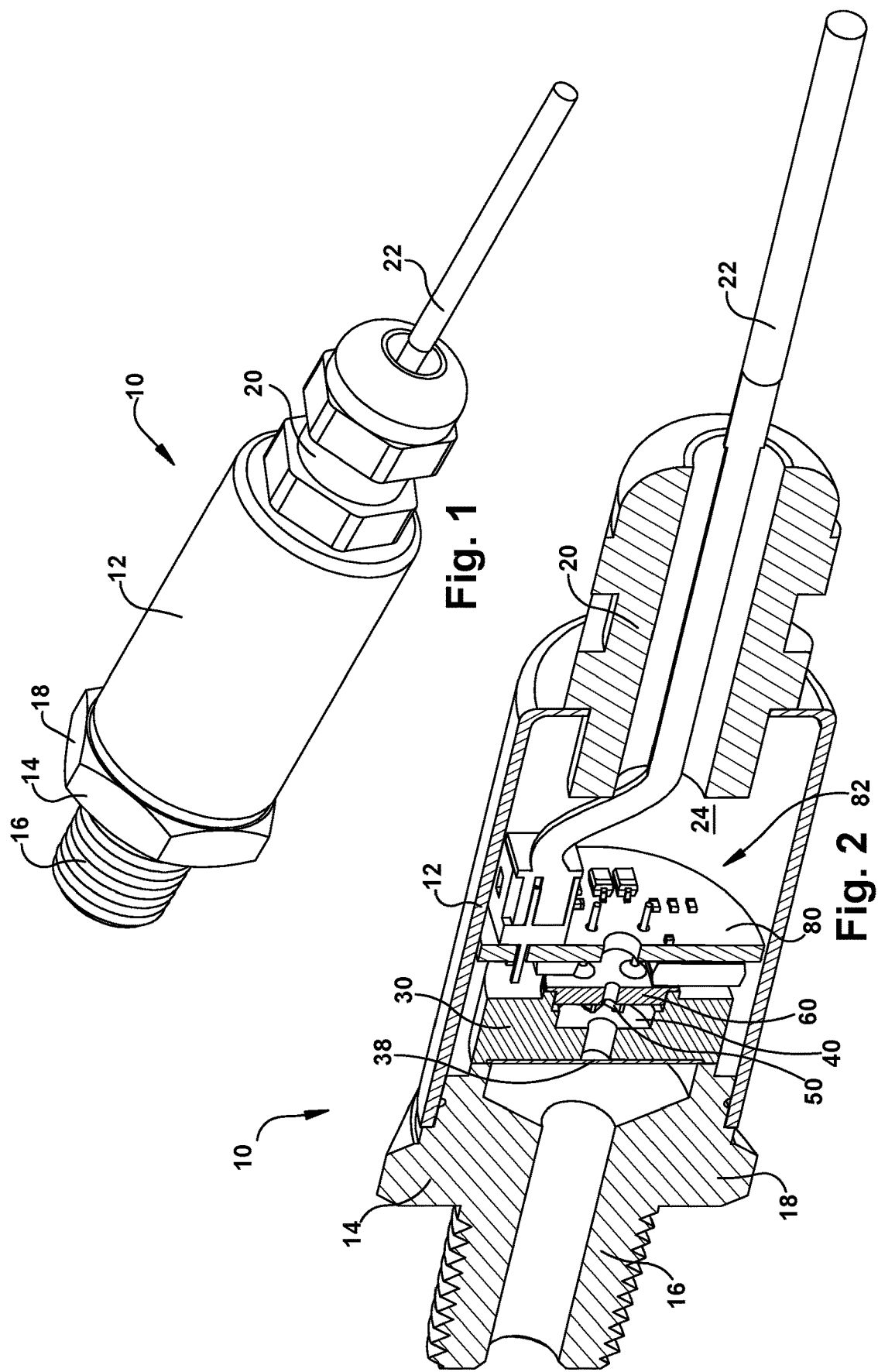

ELECTROSTATIC DISCHARGE RESISTANT PRESSURE SENSOR

RELATED APPLICATIONS

This application claims the benefit of U.S. Provisional Patent Application Ser. No. 62/683,922, filed Jun. 12, 2018, the entirety of which is hereby incorporated by reference for all purposes.

TECHNICAL FIELD

This disclosure relates to pressure sensors for sensing liquid and gas pressures in industrial applications.

BACKGROUND

Industrial pressure sensors transmit sensed pressure data in a wide variety of industrial applications, such as compressors, pumping systems, hydraulics, and industrial process monitoring. Utilizing a piezoelectric pressure sensing element, these industrial pressure sensors can be compatible with gases and liquids and can be configured to measure pressures over ranges from small (e.g., 0-5 psig) to large (e.g., 0-8000 psig) with a high degree of accuracy in a repeatable and reliable manner.

The industrial pressure sensors can operate over a wide temperature range with built-in compensation to account for thermal effects. These sensors are highly adaptive and can be selectively configured to accept various input voltages (e.g., 10 to 30 VDC) and to produce various output signals (e.g., 4 to 20 mA, 0 to 5 VDC, 0 to 10 VDC) proportional to the applied pressure. The sensor can connect to the conduit or vessel in which pressure is to be measured in any position or orientation, via male or female NPT (National Pipe Thread) and BSPT (British Standard Pipe Thread) connections (e.g., ¼-inch NPT/BSPT). The industrial pressure sensor can have a NEMA 4X (IP66) enclosure rating, offering protection from dust, oil, and other non-corrosive material, protection from water, even from powerful jets of water, and corrosion resistance. The pressure sensor can also be oil-filled for robustness to shock and vibration.

Often times it is necessary to pass electrical signals through a header from an electrical circuit on one side to a harsh environment on the other side. In the case of industrial pressure sensors, a header with glass seals separates the piezoelectric pressure sensing element on the high-pressure side from the circuitry on the low-pressure side used to interrogate it. Furthermore, it is often necessary to maintain electrical isolation between the electronics and the body/housing of the sensor. An industrial pressure sensor can require a 500 VAC high-potential (HIPOT) isolation to maintain safety requirements. Additionally, products are commonly required to survive Electrostatic Discharges (ESD). For an industrial pressure sensor, a minimum of ±4 kV is required, but a higher level can be desirable for reliability.

Typically, headers with glass seals can easily maintain HIPOT resistance, but ESD pulses can still arc through the air between the header body and each header pin. When an ESD pulse arcs to a pin, damage to the electronics can occur if the pin connects to a sensitive part of the circuit. Increasing the size of glass header seal increases the ESD resistance. Because the small size of pressure sensors is important for many applications, increasing the size of the seal large enough to withstand ESD pulses is impractical. Also, for high pressure applications of the industrial pressure sensor, increasing the size of the glass seal large enough to provide the requisite ESD resistance would result in the glass seal being too weak to handle the large pressure differential across the header.

SUMMARY

The invention relates to an industrial pressure sensor including a header and header pins that extend through the header, connecting a pressure sensing element on a high-pressure side of the header to circuitry on a low-pressure side of the header. The header includes header seals for providing a pressure seal around the pins where they pass through the header. Advantageously, the seals around header pins attached to sensitive portions of the circuit are larger than the seals around pins connected to portions of the circuit that can withstand an ESD pulse. Since the ESD pulse will follow the path of least resistance, the ESD pulse will be shunted safely through the electronics connected to the pin(s) with the smaller seals, which can withstand the pulse. This shunting spares the sensitive electronics from exposure to the ESD pulse. By maintaining a sufficient size ratio between the larger and smaller seals, ESD pulses will consistently arc to the pins having smaller seals, thereby safely shunting the ESD pulse.

According to one aspect, a pressure sensor includes a housing, a pressure chamber defined within the housing, and a pressure transducer. The pressure sensor also includes a header that seals the pressure chamber and supports the pressure transducer in the pressure chamber. A plurality of pins extend through respective openings in the header. The sensor pins have first ends electrically connected to the pressure transducer in the pressure chamber and second ends electrically connected to sensor electronics outside the pressure chamber. The pins are electrically insulated from the header. The header is configured so that the electrical insulation of at least one pin from the header is less than the electrical insulation of the remaining pins from the header.

According to another aspect, alone or in combination with any other aspect, the pressure sensor can also include a glass material that is disposed in the openings, connects the pins to the header, and electrically insulates the pins from the header. The header can be configured so that the amount of glass material that electrically insulates the at least one pin is less than the amount of glass material that electrically insulates the remaining pins.

According to another aspect, alone or in combination with any other aspect, the glass material can fill an annular space between the pins and a sidewall of their respective openings.

According to another aspect, alone or in combination with any other aspect, the opening associated with the at least one pin extends can have a diameter that is smaller than the diameter of the openings associated with the remaining pins.

According to another aspect, alone or in combination with any other aspect, the header can be configured so that ESD pulses up to a predetermined magnitude are directed through the at least one pin instead of the remaining pins.

According to another aspect, a pressure sensor header supporting a pressure transducer in a pressure chamber and through which a plurality of pins extend to electrically connect the pressure transducer to electronics outside the pressure chamber can include openings through which the pins extend. The pressure sensor also includes a glass insulating material that fills space between the pins and their respective openings and electrically insulates the pins from the header. The header is configured so that at least one opening is smaller than the remaining openings so that the degree of electrical insulation between the header and any pin extending through the at least one opening is less than the electrical insulation between the header and the remaining pins.

According to another aspect, alone or in combination with any other aspect, the amount of glass material that fills the space in the at least one opening can be less than the amount of glass material that fills the remaining openings.

According to another aspect, alone or in combination with any other aspect, the glass material can fill an annular space between the pins and a sidewall of their respective openings.

According to another aspect, alone or in combination with any other aspect, the at least one opening can have a diameter that is smaller than the diameter of the remaining openings.

According to another aspect, alone or in combination with any other aspect, the header can be configured so that ESD pulses up to a predetermined magnitude are directed through the pins extending through the at least one opening.

According to another aspect, a method provides ESD protection to a pressure sensor. The pressure sensor includes a pressure sensor header that supports a pressure transducer in a pressure chamber. The sensor header includes openings through which a plurality of pins extend to electrically connect the pressure transducer to electronics outside the pressure chamber. The sensor further includes a glass insulating material that fills space between the pins and their respective openings and electrically insulates the pins from the header. The method includes configuring the header so that at least one opening is smaller than the remaining openings so that the degree of electrical insulation between the header and any pin extending through the at least one opening is less than the electrical insulation between the header and the remaining pins.

According to another aspect, alone or in combination with any other aspect, the method can also include filling the space between the openings and the pins extending through the openings with a glass material that seals the openings and electrically insulates the pins from the header. The amount of glass material that fills the space in the at least one opening can be less than the amount of glass material that fills the remaining openings.

According to another aspect, alone or in combination with any other aspect, filling the space between the openings and the pins extending through the openings with a glass material can include centering the pins in their respective openings and filling an annular space between the pins and a sidewall of their respective openings with the glass material.

According to another aspect, alone or in combination with any other aspect, configuring the header so that at least one opening is smaller than the remaining openings can include configuring the header so that the at least one opening has a diameter that is smaller than the diameter of the remaining openings.

DRAWINGS

FIG. 1 is a perspective view illustrating a pressure sensor according to one example configuration.

FIG. 2 is a perspective sectional view of the pressure sensor.

DESCRIPTION

Figure 3:
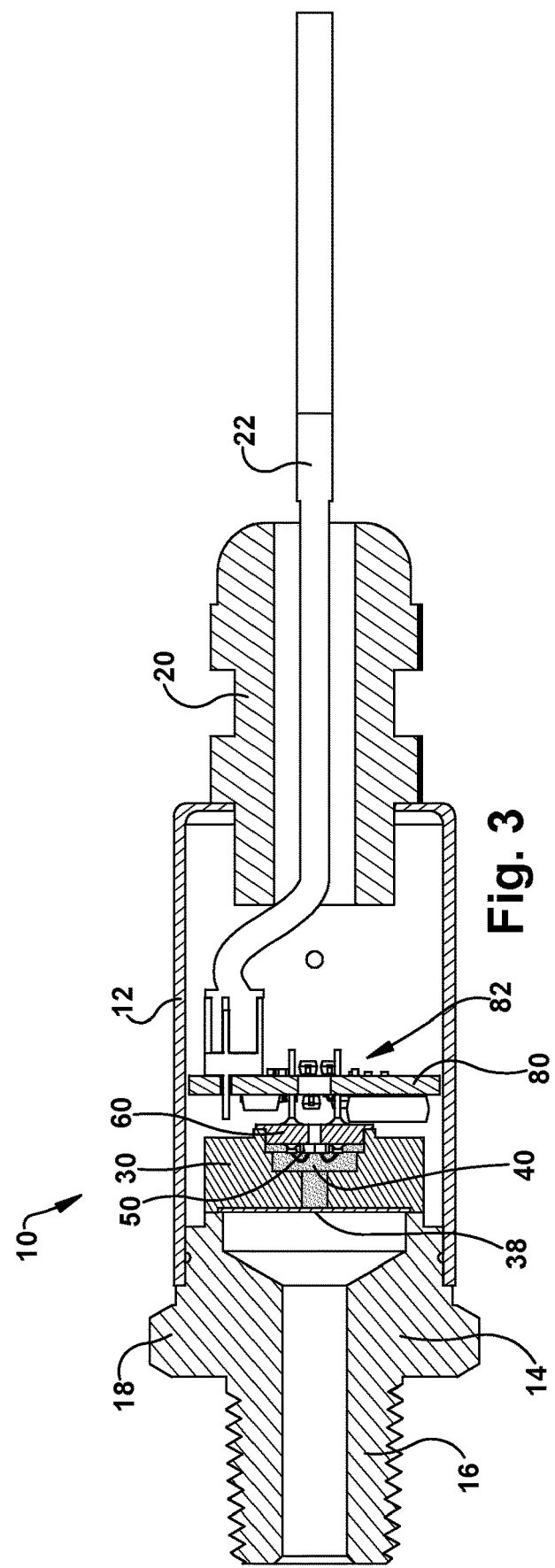
FIG. 3 is a sectional side view of the pressure sensor.
Figure 4:
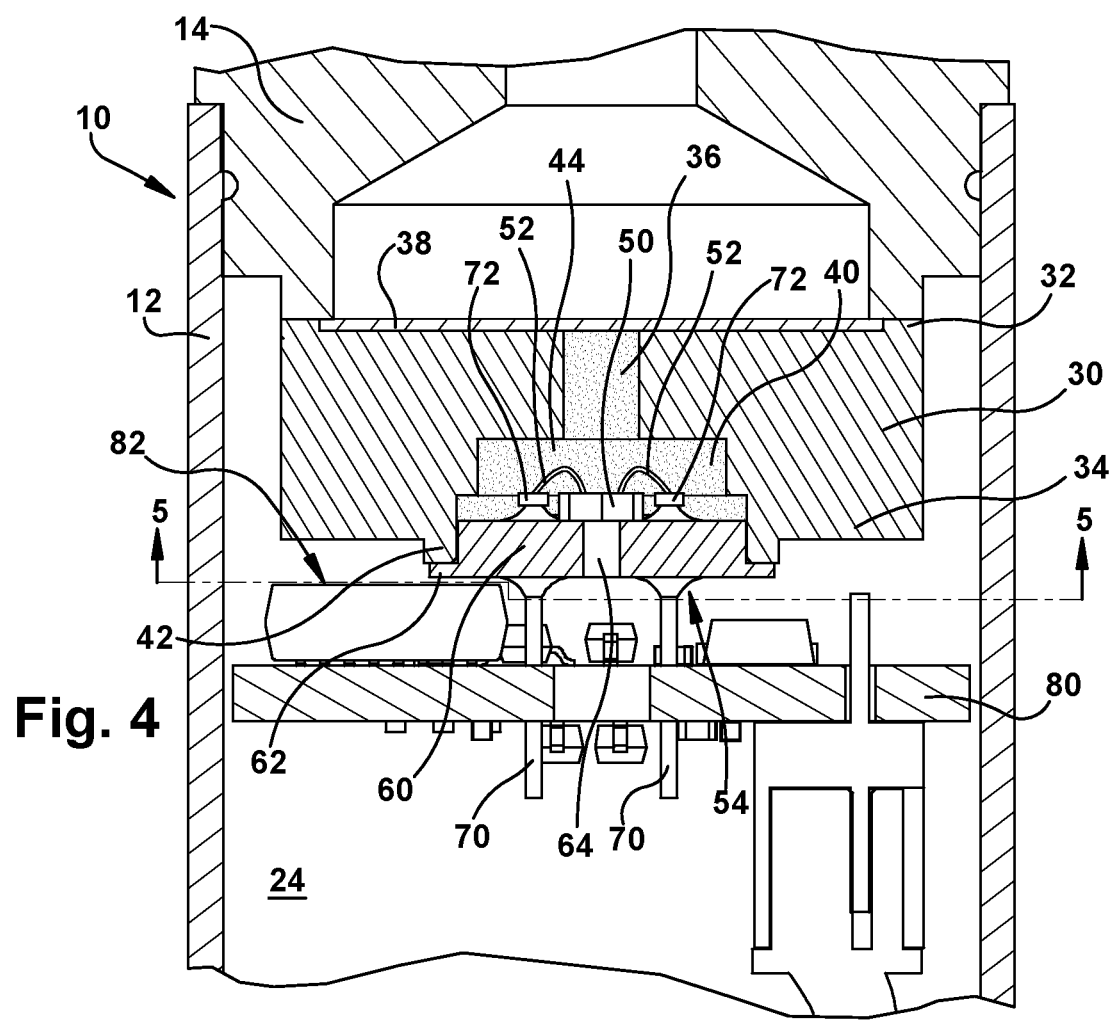
FIG. 4 is an enlarged view of a portion of FIG. 3.
Figure 5:
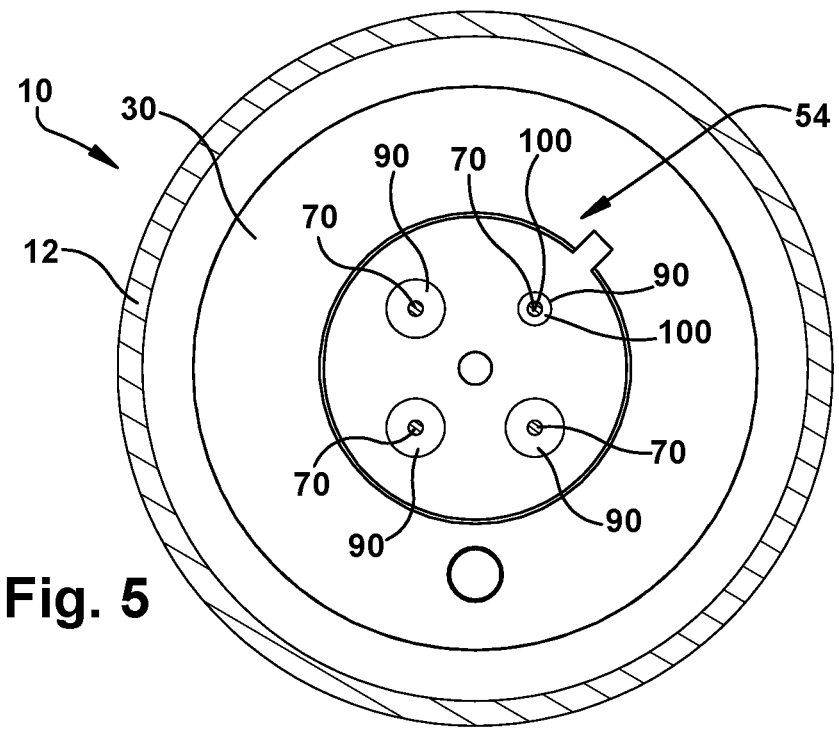
FIG. 5 is a sectional view taken generally along line 5-5 of FIG. 4.
Figure 6:
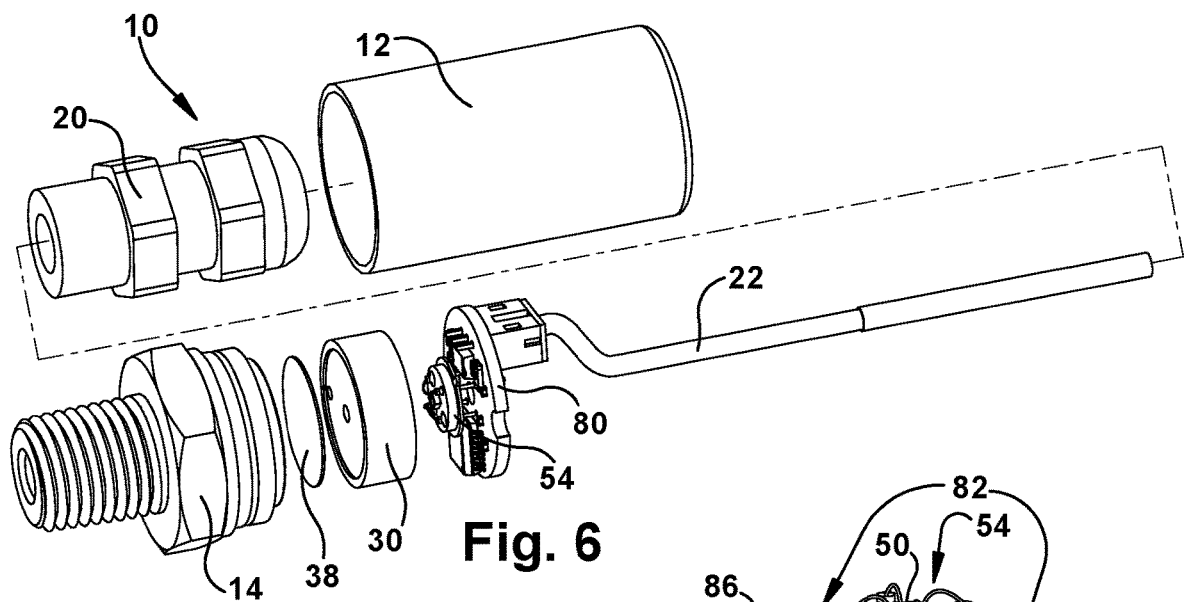
FIG. 6 is an exploded perspective view of the pressure sensor.
Figure 7:
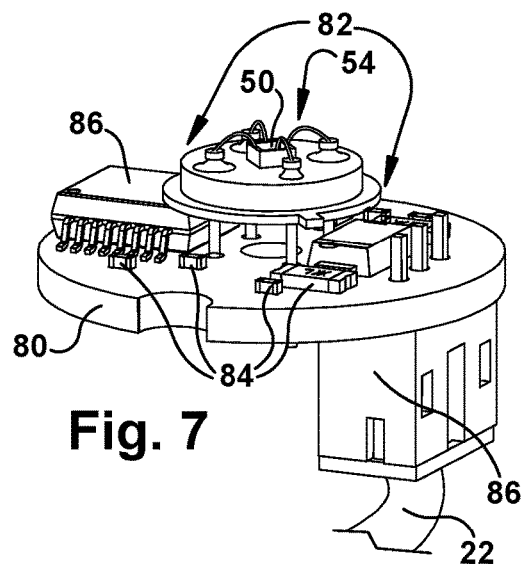
FIG. 7 is an enlarged perspective view of a portion of the pressure sensor.
Figure 8:
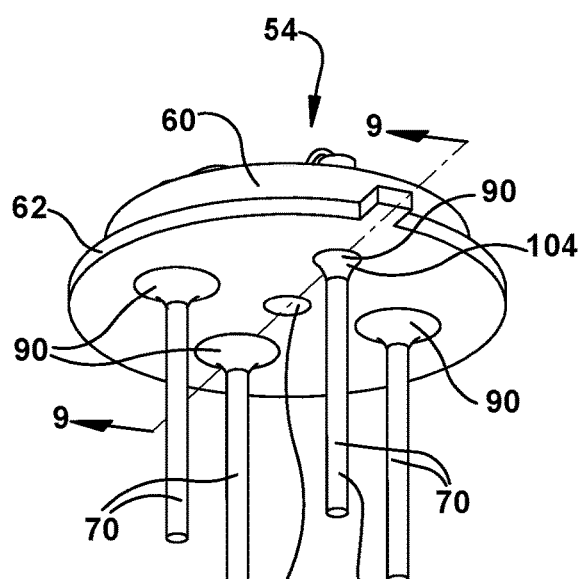
FIG. 8 is an enlarged perspective view of a portion of the pressure sensor.

FIGS. 1-3 illustrate an example configuration of a pressure sensing apparatus 10 (hereafter "pressure sensor") for sensing fluid pressure (i.e., liquid and/or gas) in a conduit or vessel. The pressure sensor 10 includes a housing 12 having a generally cylindrical configuration. A process fitting 14 is fixed to a first end of the housing 12 and includes a threaded NPT male adapter 16 for being received in a NPT female adapter on the conduit/vessel in which fluid pressure is to be sensed. The process fitting 14 can have a hexagonal or "hex" portion 18 that can be grasped via a wrench during installation of the pressure sensor 10.

The housing 12 can be constructed of a material, such as stainless steel, that is strong, durable, and robust to harsh process conditions and corrosion. The process fitting 14 can likewise have a stainless steel construction and can be connected to the housing 12 in a suitable manner, e.g., via a swaged or welded connection. Together, the sensor housing 12 and process fitting 14 help define an interior chamber 24 of the sensor 10.

An electrical feedthrough fitting 20 is connected to the housing 12 at an end opposite the process fitting 14. The feedthrough fitting 20 receives and passes through a cable 22 for transmitting sensed pressure signals from the sensor 10. The feedthrough fitting 20 can be tightened onto the cable 22 and seal that end of the interior chamber 24 from the exterior of the sensor 10, for example, via a compression-type fitting. Since the feedthrough fitting 20 engages the cable 22, and since the feedthrough fitting is isolated from the harsh process conditions, it can be constructed of a material, such as HDPE, that is robust to corrosion while non-abrasive to the cable material.

Within the housing 12, the sensor 10 includes a pressure port 30 that has a first end 32 connected to the process fitting 14, for example, via TIG welding. The pressure port 30 includes a central bore 36 that extends through the port from the first end 32 to a second end 34. A diaphragm 38 is connected to the first end 32 of the pressure port 30 and covers the central bore 36. The diaphragm 38 can, for example, be connected to the pressure port 30 through the same TIG weld used to connect the port to the process fitting 14. The connection of the diaphragm 38 to the pressure port 30 could alternatively be separate from the connection between the pressure port and the process fitting 14.

The central bore 36 has multiple diameters, increasing from small to large, from the first end 32 to the second end 34. The portion of the central bore 36 at the second end 34 of the pressure port 30 defines a sensor chamber 40 for receiving a pressure transducer 50 mounted on a header assembly 54 that is connected to the pressure port 30. In one particular configuration, the pressure transducer 50 can, for example, be a piezoresistive pressure sensing element.

The header assembly 54 includes a sensor header 60 that supports sensor pins 70 secured to the header via glass insulating material 90. The pressure port 30 and the sensor header 60 can be constructed of stainless steel and can be connected to each other, for example, via resistance welding. To facilitate this connection, the pressure port 30 can have an annular projection or rim 42 that encircles the sensor chamber 40. The sensor header 60 is received by the pressure port 30 in the sensor chamber 40 and includes an annular flange 62 that mates with and engages the annular rim 42. The connection (e.g., resistance weld) connecting the sensor header 60 to the pressure port 30 is at the interface between the flange 62 and the rim 42.

The sensor header 60 has a central bore 64 over which the pressure transducer 50 lies. The sensor chamber 40 is filled with a liquid 44, such as oil. The pressure transducer 50 is fixed to the sensor header 60 and forms a seal that blocks the oil from leaking into the central bore 64.

Figure 9:
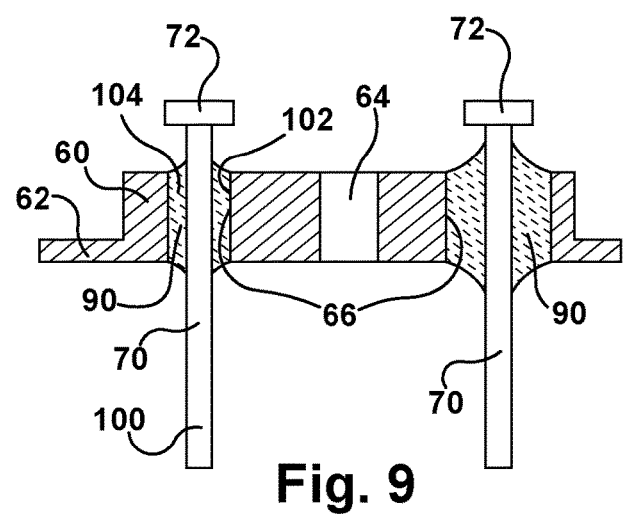
FIG. 9 is a sectional view taken generally along line 9-9 of FIG. 8.

The sensor pins 70 extend through openings 66 in the sensor header 60 and are connected to the header via the glass insulating material 90. The openings 66 are generally cylindrical in form and the glass insulating material 90 fills an annular space between the cylindrical outer surfaces of the pins 70 and the cylindrical inner wall surface of the openings 66. In addition to supporting the pins 70 in the openings 66, the glass insulating material 90 also electrically insulates/isolates the pins from the sensor header 60. Advantageously, the pins 70 can be centered in the openings 66. As shown in FIG. 9, the glass insulating material 90 can extend above and below upper and lower surfaces, respectively, of the header 60, forming a fillet bead surrounding the pins where they enter and exit the header.

The degree or level of electrical insulation/isolation provided by the glass insulating material 90 can be tailored by configuring the dimensions of the header assembly 54. It will be appreciated that the degree of electrical insulation between the pins 70 and the header 60 depends on the amount (i.e., volume) of glass insulating material 90 between the pins and the header, which is determined at least partially by the space or volume between the pins and the sidewalls of their respective openings 66. By controlling the dimensions of the components of the header assembly 54, the degree of electrical insulation for each pin 70 can be determined.

The pressure transducer 50 is connected to the sensor pins 70 electrically via wires 52 soldered or otherwise connected to heads 72 of the pins. The sensor pins 70 extend from a surface of the sensor header 60 opposite the pressure transducer 50 into the interior chamber 24, where they are connected to a printed circuit board 80 that supports sensor electronics 82, which can include discrete components 84 (e.g., resistors, capacitors, etc.), solid state devices 86 (e.g., ASICs), cable sockets 88, etc.

In operation, the diaphragm 38 is exposed to process pressures through the process fitting 14. In response to the process pressure, the diaphragm 38 deforms into the central bore 36 of the pressure port 30 and compresses the oil 44 in the sensor chamber 44. The increased oil pressure in the sensor chamber 44 deforms the diaphragm of pressure transducer 50. The degree to which the pressure transducer 50 is deformed is proportional to the pressure differential between the sensor chamber 44 and the central bore 64 of the sensor header 60, which is, or essentially is, ambient pressure.

The electrical resistance of the elements of the Wheatstone bridge of pressure transducer 50 is also proportional to the degree to which the pressure transducer diaphragm is deformed. Pressure applied to the Wheatstone bridge of sensor 10, will produce a pressure signal whose voltage varies proportionally with the gauge pressure of the process fluid(s) to which it is exposed via the process fitting 14. The pressure range of the sensor can be determined by configuring the pressure transducer 50 to be sensitive to a desired range of pressures. The sensor 10 can be configured to sense pressures that are relatively small (e.g., 0-5 psig) or relatively large (e.g., 8000 psig or more). Similarly, the sensor 10 can be configured to sense pressures that vary over a small range (e.g., a span of 5 psig) or a large range (e.g., a span of 1000 s psig).

From the above, those skilled in the art will appreciate that the pressure sensor 10 measures, via the pressure transducer 50, a pressure differential between the pressure fitting 14 and the ambient environment of the sensor. The accuracy and functionality of the sensor 10 thus depends on an effective fluid-tight seal of the sensor chamber 40. The welded connections between the pressure port 30, diaphragm 38, and sensor header 60 help facilitate this seal. The seal is completed by sealing the space between the sensor pins 70 and the openings 66 in the sensor header 60. Since the sensor pins 70 connect the pressure transducer 50 electrically to the sensor electronics 82, and because the sensor header 60 is connected to ground via its connection/contact with the sensor housing 12, pressure port 30, and process fitting 14, the pins must also be electrically isolated from the sensor header. The glass insulating material 90 performs both tasks, i.e., sealing the pins against process pressure and electrically insulating the pins from the sensor header.

To accomplish this, the sensor pins 70 can be constructed of a nickel-cobalt ferrous alloy known as Kovar™, which is a trademark of CRS Holdings, Inc., a Delaware corporation. The space surrounding the sensor pins 70 in the openings 66 are filled with the glass insulating material 90, particularly a borosilicate glass material, to secure the pins to the sensor header 60. The alloy from which the sensor pins 70 are constructed, such as the Kovar™ alloy, is designed to have substantially the same or identical thermal expansion characteristics as the borosilicate glass insulating material 90.

The thermal expansion characteristics of the glass insulating material 90 also are similar to those of the sensor header 60. When the sensor pins 70 are installed on the sensor header 60 with the glass insulating material 90, the assembly is heated and the insulating material is melted. The insulating material 90 bonds to the metals of the header 60 and pin 70, forming a tight seal that can withstand extremely high pressures. Since the thermal expansion/contraction of the sensor header 60, sensor pins 70, and glass insulating material 90 is identical or substantially the same, the seals between the three will not be compromised if/when the sensor 10 and/or the sensor header assembly 54 is cycled thermally.

The sensor electronics 82 can be affected negatively, i.e., damaged or ruined, by electrostatic discharge (ESD) pulses that passes through the pressure sensor 10. Therefore, it will be appreciated that it is desirable to configure the pressure sensor 10 to be robust to ESD pulses up to a certain level or degree. For instance, the International Electrotechnical Commission (IEC) ESD standard IEC 61000-4-2:2008 awards a level 2 ESD protection rating for a unit under test that can withstand ESD equal to or exceeding 4 kV without failure.

ESD will take the path(s) of least resistance through the pressure sensor 10 to ground. Testing has shown that this path can at least partially include the sensor pins 70 and, accordingly, the sensor electronics 82. It is the ESD path through the sensor pins 70 that can cause the sensor electronics to fail in response to ESD pulses. For a pressure sensor 10 with multiple sensor pins 70 configured identically and symmetrically, it is impossible to predict through which pin or pins an ESD pulse will travel.

Advantageously, the pressure sensor 10, particularly the header assembly 54, is configured so that ESD pulses are directed away from the sensor electronics and passed harmlessly to ground. The header assembly 54 is configured so that ESD pulses are directed through a specific one of the sensor pins 70, which is identified as ground pin 100. The ground pin 100 is grounded, i.e., tied electrically to system common on the PCB 80 and for the sensor electronics 82.

To force or urge ESD pulses to pass through the ground pin 100, the opening 66 in the sensor header 60 and the glass insulating material 90 surrounding the ground pin in the opening are configured differently than the insulating material and header openings for the remaining pins 70. For clarity, when referring specifically to the ground pin and its associated sensor header opening and glass insulating material, reference numbers 100, 102, and 104, respectively, are used. When referring to the sensor pins, sensor header openings, and glass insulating material in general, reference numbers 70, 66, and 90, respectively, are used.

The dielectric properties of the glass insulating material 90 itself is the same, regardless of which header opening 66 it fills or which sensor pin 70 it surrounds. The level of electrical insulation or isolation afforded by the glass insulating material 90 depends on the amount of insulating material isolating each sensor pin 70 from the header 60. Advantageously, the sensor 10, particularly the header assembly 54, is configured so that ESD pulses are directed through the ground pin 100.

To direct ESD pulses through the ground pin 100, the sensor header opening 102 associated with the ground pin has a diameter that is smaller than the other openings 66. The diameter of the ground pin 100 is the same as the diameters of the remaining pins 70. As a result, the thickness of the glass insulating material 104, measured radially from the outer diameter of the ground pin 100 to the inner diameter of the header opening 102, is smaller than the corresponding thicknesses of the insulating material 90 for the remaining pins 70 and their corresponding openings 66. Because of this, the electrical isolation of the ground pin 100 from the header 60 is less than the electrical isolation of the remaining pins 70- and the header. As a result, ESD pulses are drawn to the ground pin 100, as opposed to the remaining pins 70, because the ground pin offers the path of least electrical resistance.

Of course, there are limits to the magnitude of the ESD pulses that can be drawn to the ground pin 100 in this manner. ESD pulses of a certain magnitude can overwhelm the configuration and arc to remaining pins 70 in addition to the ground pin 100. The configuration of the header assembly 54 can, however, provide certain minimum ESD protections. For example, the header assembly 54 can provide a minimum of ±4 kV ESD protection or higher.

For example, in one particular four-pin configuration of the header assembly 54, the pins had a diameter of 0.0177±0.0015 inches. The header opening 102 for the ground pin 100 had a diameter of 0.047±0.001 inches. The header opening 66 for the remaining pins 70 had a diameter of 0.079±0.001 inches. In this configuration, the header assembly 54 repeatedly and reliably directed ESD pulses in excess of ±4 kV through the ground pin 100.

While the invention has been described with reference to example configurations, those skilled in the art will appreciate that various changes can be made to the invention and equivalents can be substituted for elements of the invention without departing from the spirit and scope of the invention. Those skilled in the art will also appreciate that modifications can be made to adapt the invention for use in particular applications without departing from the spirit and scope of the invention. It should therefore be understood that the invention should not be limited to any particular configuration or implementation described herein. Instead, the invention can include any configuration falling within the scope of the appended claims.

We claim:

1. A pressure sensor comprising:
    a housing;
    a pressure chamber defined within the housing;
    a pressure transducer comprising a bridge circuit;
    a header that seals the pressure chamber and supports the pressure transducer in the pressure chamber; and
    a plurality of pins that extend through respective openings in the header and electrically connect the bridge circuit of the pressure transducer in the pressure chamber to sensor electronics outside the pressure chamber, the pins being electrically insulated from the header, wherein the header is configured so that the electrical insulation of at least one pin from the header is less than the electrical insulation of the remaining pins from the header, and wherein the at least one pin comprises a ground pin of the bridge circuit.

2. The pressure sensor recited in claim 1, wherein the header is configured so that electrostatic discharge pulses up to a predetermined magnitude are directed through the at least one pin instead of the remaining pins.

3. The pressure sensor recited in claim 1, further comprising a glass material that is disposed in the openings, connects the pins to the header, and electrically insulates the pins from the header, wherein the header is configured so that the amount of glass material that electrically insulates the at least one pin is less than the amount of glass material that electrically insulates the remaining pins.

4. The pressure sensor recited in claim 3, wherein the glass material fills an annular space between the pins and a sidewall of their respective openings.

5. The pressure sensor recited in claim 3, wherein the opening associated with the at least one pin has a diameter that is smaller than the diameter of the openings associated with the remaining pins.

6. A pressure sensor header that supports a pressure transducer in a pressure chamber and through which a plurality of pins extend to electrically connect the pressure transducer to electronics outside the pressure chamber, the header comprising:
    openings through which the pins extend; and
    a glass insulating material that fills space between the pins and their respective openings and electrically insulates the pins from the header,
    wherein the header is configured so that at least one opening is smaller than the remaining openings so that the glass insulating material in the at least one opening provides a degree of electrical insulation between the header and any pin extending through the at least one opening that is less than a degree of electrical insulation that the glass insulating material provides between the header and the remaining pins, wherein the pressure transducer that the header is configured to support comprises a bridge circuit, and wherein the at least one opening is configured to receive a ground pin of the bridge circuit.

7. The pressure sensor header recited in claim 6, wherein the amount of glass material that fills the space in the at least one opening is less than the amount of glass material that fills the remaining openings.

8. The pressure sensor header recited in claim 6, wherein the glass material fills an annular space between the pins and a sidewall of their respective openings.

9. The pressure sensor header recited in claim 6, wherein the at least one opening has a diameter that is smaller than the diameter of the remaining openings.

10. The pressure sensor header recited in claim 6, wherein the header is configured so that electrostatic discharge pulses up to a predetermined magnitude are directed through the ground pin extending through the at least one opening.

11. A method for providing electrostatic discharge protection to a pressure sensor including a pressure sensor header that supports a pressure transducer comprising a bridge circuit in a pressure chamber, the sensor header including openings through which a plurality of pins of the bridge circuit extend to electrically connect the pressure transducer to electronics outside the pressure chamber, the sensor further including a glass insulating material that fills space between the pins and their respective openings and electrically insulates the pins from the header, the method comprising configuring the header so that at least one opening is smaller than the remaining openings so that the glass insulating material in the at least one opening provides a degree of electrical insulation between the header and a ground pin of the bridge circuit extending through the at least one opening that is less than a degree of electrical insulation that the glass insulating material provides between the header and the remaining pins of the bridge circuit.

12. The method recited in claim 11, wherein configuring the header so that at least one opening is smaller than the remaining openings comprises configuring the header so that the at least one opening has a diameter that is smaller than the diameter of the remaining openings.

13. The method recited in claim 11, further comprising filling the space between the openings and the pins extending through the openings with a glass material that seals the openings and electrically insulates the pins from the header, wherein the amount of glass material that fills the space in the at least one opening is less than the amount of glass material that fills the remaining openings.

14. The method recited in claim 13, wherein filling the space between the openings and the pins extending through the openings with a glass material comprises centering the pins in their respective openings and filling an annular space between the pins and a sidewall of their respective openings with the glass material.

* * * * *